United States Patent [19]

Malo et al.

[11] 4,121,495
[45] Oct. 24, 1978

[54] CAR KEY HOLE BOLT FASTENING ASSEMBLY

[75] Inventors: Lowell L. Malo, St. Peters; James R. Zimmerle, Florissant, both of Mo.

[73] Assignee: ACF Industries, Incorporated, New York, N.Y.

[21] Appl. No.: 662,598

[22] Filed: Mar. 1, 1976

[51] Int. Cl.² .................... B61C 17/04; B61D 23/00; F16B 1/00; F16B 3/00
[52] U.S. Cl. ................... 85/1 H; 85/50 R; 105/460; 105/461; 182/194; 248/223.2; 248/342; 285/4; 285/370; 403/2; 403/353
[58] Field of Search ............... 105/1 A, 367, 409, 460, 105/461, 368, 473, 486, 498, 499, 500, 501; 85/1 H, 1 J, 1 P, 7, 50 R, 61; 182/194; 248/343, 222.3, 222.4, 223.1, 223.2, 342; 285/4, 47, 50, 243, 370; 403/2, 353

[56] References Cited

U.S. PATENT DOCUMENTS

| | | | |
|---|---|---|---|
| 1,003,662 | 9/1911 | Sharp | 85/1 H |
| 1,030,476 | 6/1912 | McManaman et al. | 85/1 H |
| 1,034,533 | 8/1912 | Thalheimer | 85/1 H |
| 1,088,105 | 2/1914 | Sharp | 85/1 H |
| 1,179,665 | 4/1916 | Shank | 105/461 |
| 1,210,595 | 1/1917 | Brubaker | 85/1 H |
| 1,251,800 | 1/1918 | Marquette | 248/343 |
| 1,280,456 | 10/1918 | Harmon | 182/194 |
| 3,181,413 | 5/1965 | Wing | 85/61 X |
| 3,247,752 | 4/1966 | Greenleaf et al. | 85/1 JP |
| 3,606,357 | 9/1971 | Yonkers | 85/1 JP X |
| 3,715,993 | 2/1973 | Orlik | 105/367 |
| 3,803,972 | 4/1974 | Deutsher | 85/1 JP |
| 3,842,756 | 10/1974 | Marulic | 105/409 |

*Primary Examiner*—Albert J. Makay
*Assistant Examiner*—Howard Beltran

*Attorney, Agent, or Firm*—Henry W. Cummings

[57] ABSTRACT

An assembly is provided for blind hole mounting an external appurtenance including safety appliances such as ladder rungs, hand holds, and walkways on a railway freight car. One or more key hole slots are provided through the surface of the car where the external appurtenance is to be mounted. Each slot includes an enlarged bolt head receiving portion through which the head of a fastening bolt may be inserted and a key portion of smaller size forming a continuation of the slot into which the shank of the bolt may be slipped for retaining the fastening bolt in the slot. The relative dimensions of the bolt head and the bolt head receiving portion of the key hole slot are such that the bolt head can only pass through the bolt head receiving portion of the key hole slot when the bolt head is first inserted edgewise through the bolt head receiving portion and the bolt then rotated to a perpendicular position relatively to the key hole slot. The bolt shank has a movable retainer thereon of a size to cover a portion of the key hole slot and prevent the bolt from dropping through the blind hole both during insertion through the bolt head receiving portion of the key hole slot and during subsequent assembly of an appliance to the shank of the bolt. The shank portion includes threads or grooves to hold the retainer in place on the shank. A bolt fastener applied to the shank of the bolt retains the safety appliance on the shank of the bolt and compresses the retainer between the appliance and the surface of the car over the key hole slot. The bolt fastener may include a nut or a collar crimped or swaged in place. Caulking material may be applied to the retainer before the safety appliance is applied to the bolt shank to seal any portion of the slot not covered by the retainer.

21 Claims, 15 Drawing Figures

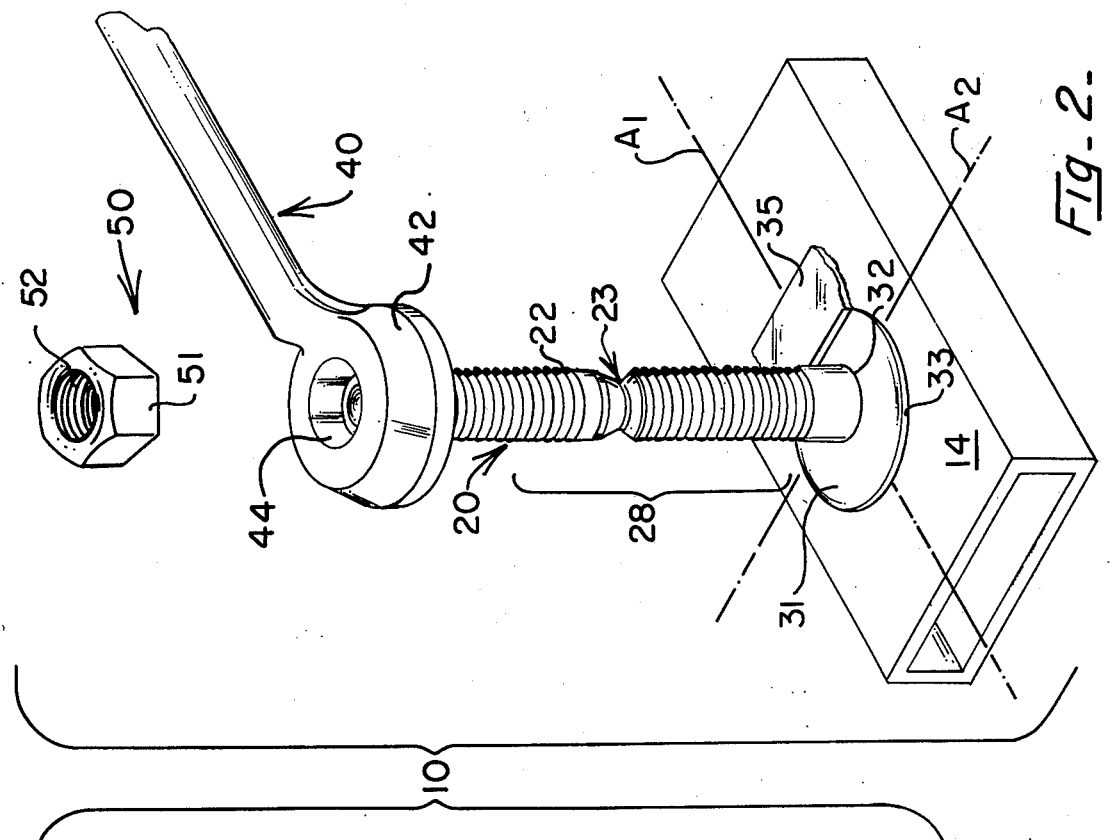
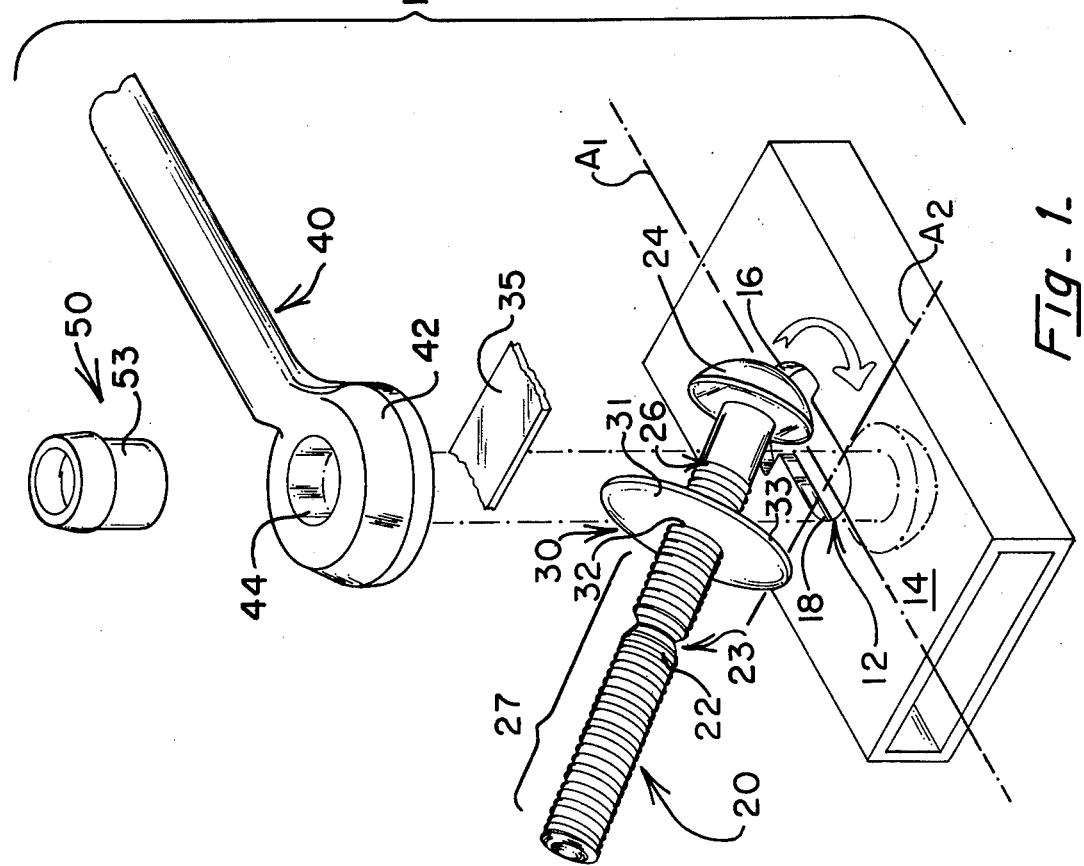

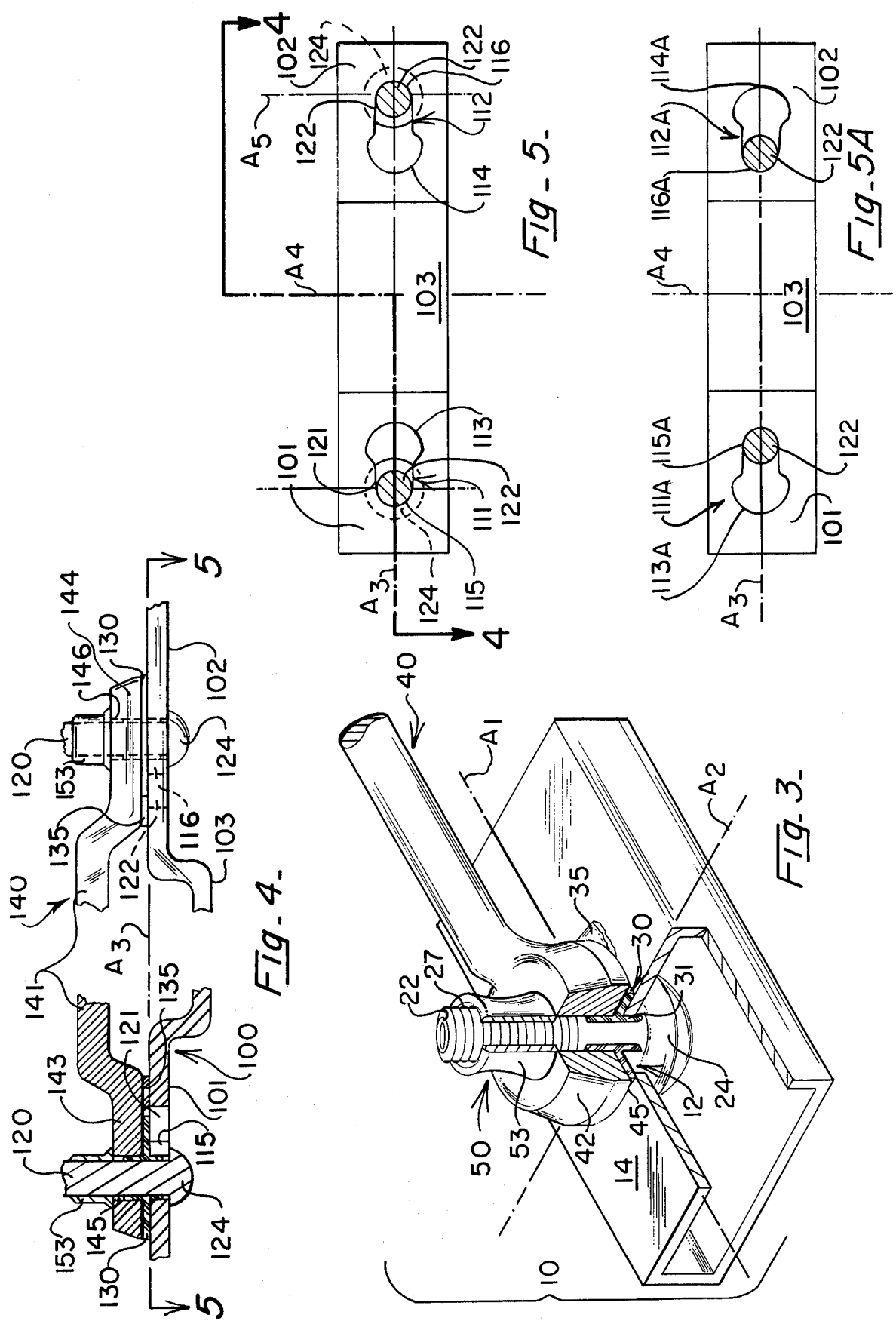

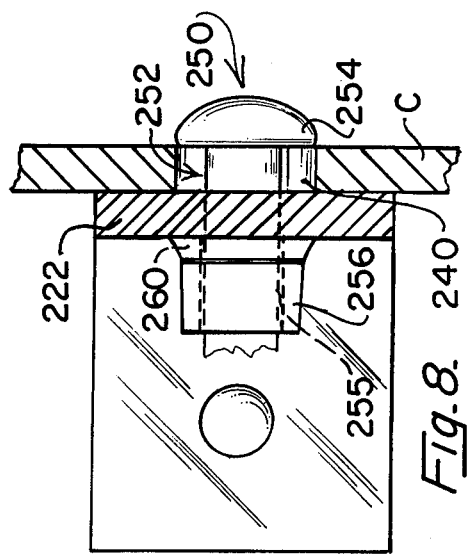
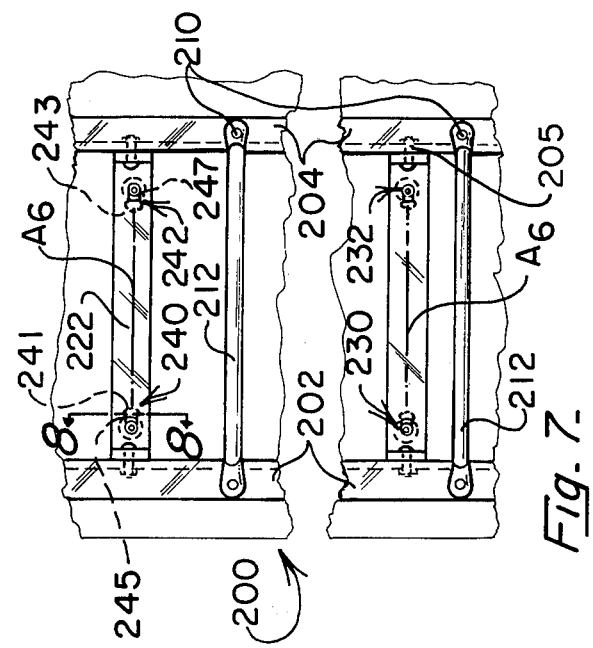
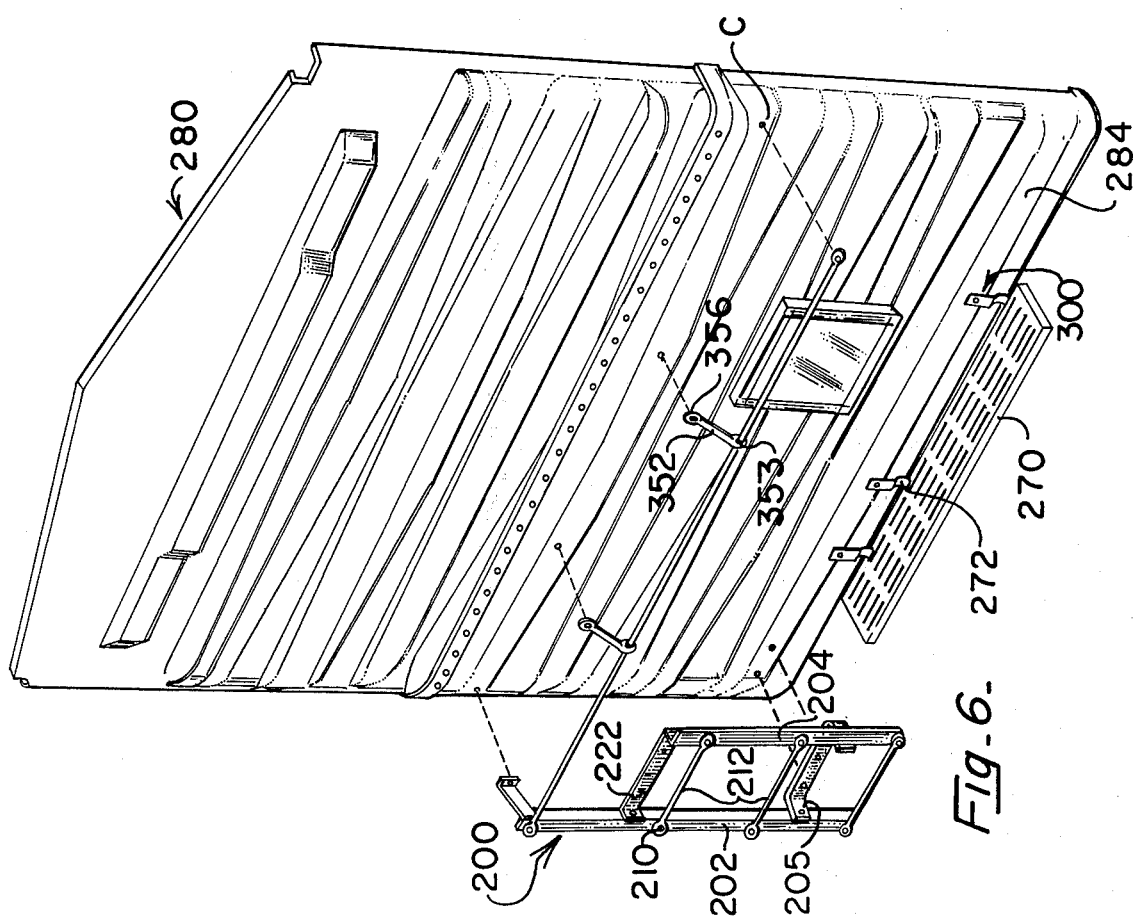

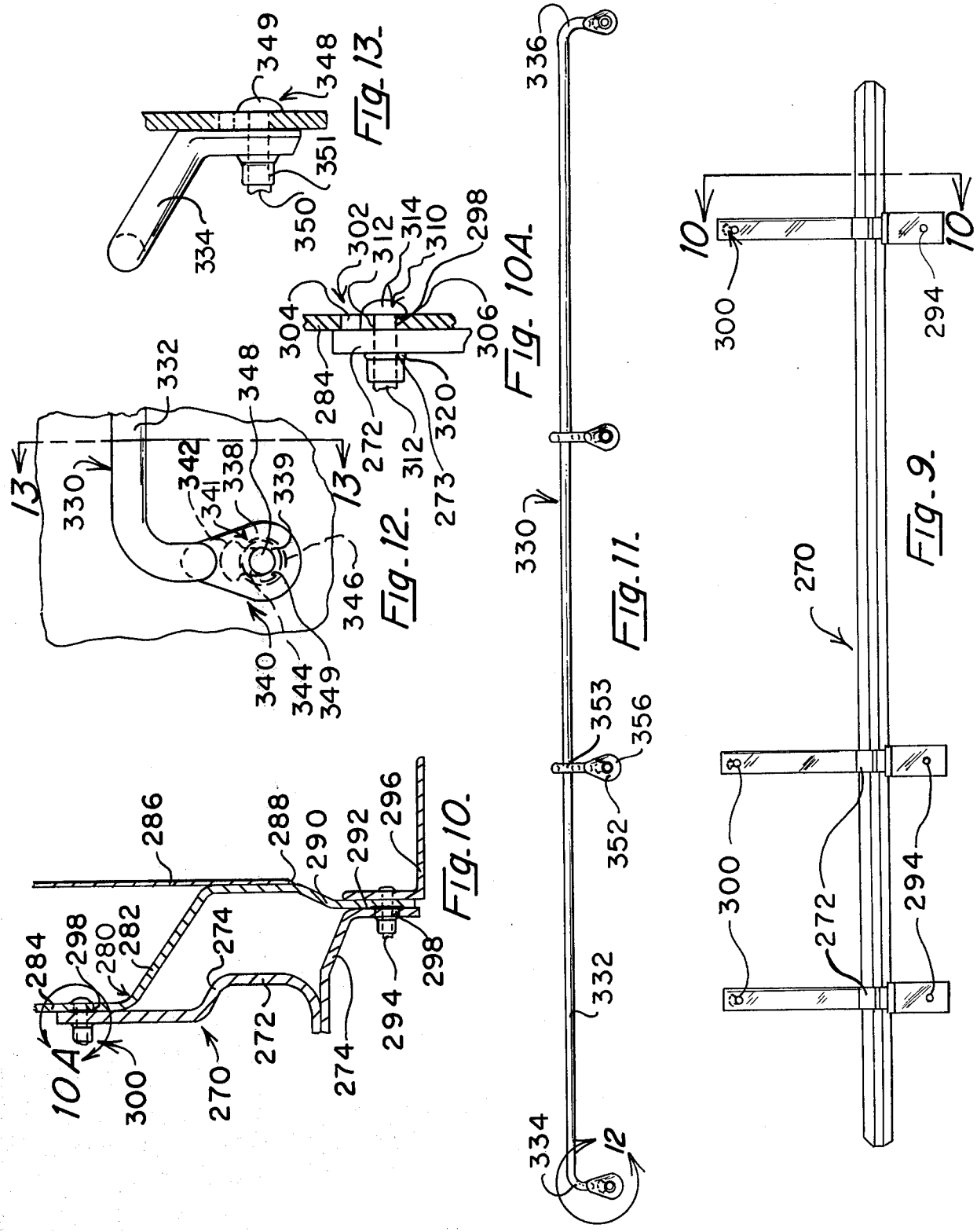

CAR KEY HOLE BOLT FASTENING ASSEMBLY

BACKGROUND OF THE INVENTION

Safety appliances including but not limited to ladder rungs, hand holds and walkways generally must be attached to railway freight cars with fasteners because rules of the Association of American Railroads require that such safety appliances not be welded to the car. If such a safety appliance is to be mounted on a surface of the car where there is no access behind the mounting surface, the appliance must be mounted by means of a blind hole formed in the mounting surface. Such blind hole mounting is required for mounting safety appliances in many places on the sides and ends of the car.

Previously blind hole mounting of safety appliances on railways cars has been done by providing one or more vertically extending key slots in the mounting surface with the bolt head receiving portion of the slot above the key portion of the slot. The size of the head receiving portion of such key hole slots are larger than the transverse dimensions of the bolt head and the head of the bolt is inserted perpendicularly into the head portion of the slot and moved into the key portion so that the head is prevented from removal from the slot by the key portion of the slot. A shoulder formed on the shank portion of the bolt prevents the bolt from dropping through the key portion of the slot. The shoulder however is not sufficiently large to prevent the bolt from dropping through the bolt head receiving portion of slot during initial insertion of the bolt. An elongated metallic washer having a dimple is applied to the flat neck bolt. The dimple in the elongated metallic washer engages the head portion of the key slot to prevent the bolt from coming out of the slot by vertical movement. The bolt has a flat neck and a safety appliance or a safety appliance support is provided with openings through which the shank of the flat neck bolt passes and threaded nuts hold the appliance or appliance support on the shank. Since the bolt has a flat neck the key portion of the slot prevents the bolt from rotating when a fastening nut is applied. To ensure that the flat neck bolts will not vibrate off, a welder heats the shank portion of the flat neck bolt and then the shank is deformed to hold the nut in place.

The elongated metallic washers and the flat neck bolts are often difficult to obtain. When they are available they tend to be expensive. The heating and shank deformation steps require expensive welder time for each blind hole fastener applied to the car.

While the elongated metallic washer covers the mounting slot, it does not provide a seal sufficient to prevent significant amounts of water and other material from entering the slot and thus enter the space behind the mounting surface. In some portions of the car such water or material will automatically drain, and a seal may not be required. However, in other portions drainage is not provided and a seal for the slot is needed.

SUMMARY OF THE INVENTION

In accordance with the present invention an assembly is provided for blind hole mounting of an external appurtenance including, but not limited to such safety appliances as ladder rungs, hand holds, and walkways, and support members for such safety appliances on a railway freight car. One or more key hole slots are provided in the surface of the car where the safety appliance is to be mounted. Each slot includes an enlarged bolt head receiving portion through which the head of a fastening bolt may be inserted and a key portion of smaller size, forming a continuation of the slot into which the shank of the bolt may be slipped for retaining the fastening bolt in the slot. The relative dimensions of the bolt head and the bolt head receiving portion of the key hole slot are such that the bolt head can only pass through the bolt head receiving portion of the key hole slot when the bolt head is first inserted edgewise through the bolt head receiving portion and the bolt then rotated to a perpendicular position relative to the key hole slot. The bolt shank has a plastic retainer mounted thereon of a size to cover a portion of the slot and prevent the bolt from dropping into the blind hole both during insertion through the head receiving portion and during subsequent assembly of the appliance to the shank of the bolt. The shank portion includes means to hold the retainer in place on the shank. After the fastening bolt is inserted into the key hole slot the retainer covers at least a portion of the slot. At least one opening is provided in the safety appliance member to receive the shank of the fastening bolt. A bolt fastener is used to tighten the safety appliance member against the retainer and mounting surface. If the shank is threaded, the bolt fastener may include a nut. Preferably the bolt fastener may include a collar which is crimped or swaged in place to thereby avoid the necessity of heating the bolt and bending the shank as in the case when a nut is used. If it is desired to seal the key hole slot and the retainer on the bolt shank does not cover all of the slot, before the safety appliance member is applied to the bolt shank, caulking may be applied to the retainer to cover the remaining portion of the slot.

The key hole slots may be formed to extend either vertically or horizontally in the mounting surface. However, to reduce any chance that the fastening bolts could come out of slots extending vertically in the mounting surface by the shank moving vertically into the head portion of the slot and rotating out, in accordance with a preferred embodiment of the invention, a pair of spaced key slots are provided in the car surface for each appliance with the key portions in alignment but extending in opposite directions from their respective head receiving portion. A pair of openings is formed in a safety appliance member spaced apart such that the shanks of fastening bolts inserted into each of the horizontally extending slots will align with the spaced openings in the safety appliance member only when the shanks of the fastening bolts are located in the key portions of the pair of slots. Preferably the openings in the safety appliance member are spaced such that the openings will align with the fastening bolt shanks only when the shanks are placed in the extreme end portions of the key portions of the slots.

THE DRAWINGS

FIG. 1 is an exploded perspective view of one embodiment of the blind hole safety appliance mounting arrangement of the present invention;

FIG. 2 is an exploded perspective view of another embodiment of the blind hole safety appliance mounting arrangement of the present invention;

FIG. 3 is a perspective view of the blind hole safety appliance mounting arrangement shown in FIG. 1 with the bolt in place in the key slot, and the retainer, safety appliance, member and fastener applied to the bolt shank, and the bolt fastener tightened down to hold the safety appliance member and the retainer in place on the mounting surface;

FIG. 4 is a view of a ladder rung mounted upon a channel surface of a railway car with the blind hole mounting arrangement of the present invention, partly in section looking in the direction of the arrows along the line 4—4 in FIG. 5;

FIG. 5 is a sectional view looking in the direction of the arrows along the line 5—5 in FIG. 4 illustrating one embodiment of the use of aligned key slots in accordance with the present invention;

FIG. 5A is a sectional view similar to FIG. 5 illustrating an alternative embodiment of the use of aligned key slots in accordance with the present invention;

FIG. 6 is a perspective view of the end of a box car illustrating several examples of the use of the blind hole fastening arrangement of the present invention;

FIG. 7 is a side elevation view illustrating the mounting of safety appliance support according to the present invention;

FIG. 8 is a sectional view looking in the direction of the arrows along the line 8—8 in FIG. 7;

FIG. 9 is a side elevation view illustrating the mounting of a walkway on a railway car according to the mounting arrangement of the present invention;

FIG. 10 is a sectional view looking in the direction of the arrows along the line 10—10 in FIG. 9;

FIG. 10A is an enlarged view of the portion of FIG. 10 indicated by the arrows along the line 10A in FIG. 10;

FIG. 11 is an enlarged side elevation view illustrating the mounting of a handhold assembly on a railway car according to the present invention in which mounting portions of the handhold are applied to the railway car with the mounting arrangement of the present invention, and intermediate supports for the handhold are mounted on the car with the mounting arrangement of the present invention;

FIG. 12 is an enlarged view of the portion of FIG. 11 indicated by the arrows along the line 12 in FIG. 11; and FIG. 13 is a view looking in the direction of the arrows along the line 13—13 in FIG. 12.

DESCRIPTION OF PREFERRED EMBODIMENTS

The blind hole safety appliance mounting arrangement is indicated in FIG. 1 generally at 10. A key hole slot 12 is first formed through a surface 14 on which the safety appliance is to be mounted. The key hole slot includes a bolt head receiving portion 16 and a key portion 18. A fastening bolt 20 includes a shank portion 22 and a head portion 24. Shank portion 22 may include an optional shear groove 23. Examples of suitable fastening bolts are found in the catalogue Huck Industrial Fasteners, Copyright 1972, Huck Manufacturing Co., pages 2-6.

A plastic retainer 30 includes a body portion 31 having an opening 32 of size to provide an interference fit over the shank portion 22 of the fastening bolt 20. The retainer is preferably applied to the fastening bolt 20 before the fastening bolt is inserted into the key hole slot 12. Means for maintaining the retainer in place on the fastening bolt shank are provided on the shank indicated generally at 26. This may include grooves 27 on the shank or threads 28 on the shank (FIG. 2).

The head area of the receiving portion 16 of key hole slot 12 is smaller than the transverse area of the fastener head 24 but larger than the maximum axial cross section of the fastener head 24 so that the fastener head 24 can only pass through the bolt head receiving portion 16 by placing the fastener 20 generally parallel to the surface 14 along the axis $A_1$ of the key hole slot 12 as illustrated in FIG. 1 and first inserting the head portion 24 of the fastener edgewise into the head receiving portion 16 and then by rotating the shank portion 22 about the transverse axis A2 of the key hole slot. Because of the relative dimensions of the head portion 24 of the bolt 20, the head portion 14 cannot thereafter be withdrawn perpendicularly through the head portion 16 of the key hole slot 12.

The retainer 30 is dimensioned to be sufficiently large relative to the bolt head receiving portion 16 of the key hole slot 12, to prevent the fastening bolt 20 from accidently dropping through the key hole slot 12 behind plate 14 while the fastening bolt is being inserted and/or during application of safety appliance member 40.

After insertion, the fastening bolt is moved longitudinally in the key slot along axis A1 so that the head portion 24 of the fastening bolt is located behind the key portion 18 of the slot and the shank portion 22 extends perpendicularly from the plane of the mounting surface 14. The head portion is sufficiently large relative to the key portion 18 that the bolt is prevented from removal from the key portion 18. If desired, the retainer 30 may be applied to the fastening bolt shank 22 after the fastening bolt is inserted into key slot 12, but application of the retainer 30 after the fastening bolt 20 is inserted into the key slot involves the risk that the fastening bolt will drop into the key slot behind the plate 14 during insertion of the fastening bolt 20.

A safety appliance member 40 is next applied to the fastening bolt shank 22. The safety appliance member 40 may be a safety appliance, such as a ladder rung, hand hold or walkway. Alternatively, the safety appliance member 40 may be a support for a safety appliance which is appropriately affixed to a safety appliance with mechanical fasteners or by welding. The safety appliance member 40 is provided with a mounting portion 42 having an opening therein 44 dimensioned to fit over shank portion 22 of fastening bolt 20.

Either prior to or during application of the safety appliance member 40 to the shank 22 the retainer 30 is forced inwardly and engages the mounting surface 14 covering all of a portion of key hole slot 12. (FIG. 2).

Retainer 30 and safety appliance member 40 are maintained in place on shank 22 by means of a bolt fastener 50. If shank portion 22 is threaded as indicated at 28 in FIG. 2, bolt fastener 50 may be a nut 51 (FIG. 2) having threads 52 which cooperate with threads 28 on shank 22 when nut 51 is rotated relative to shank 22 and tightened down to hold the safety appliance member 40 and retainer 30 in place.

Alternatively, bolt fastener 50 may be a collar 53 (FIG. 1) made of easily deformable metal having an opening which is placed on shank 22 over safety appliance member 40 and is then crimped or swaged in place with a suitable crimping and/or swaging tool. Collars 53 are commercially available. For example, see the above identified Huck Manufacturing Co. Catalogue pages 14 and 15. Preferably a crimping or swaging tool is used which deformes the bolt fastener into the grooves on the shank (discussed on page 3 of said catalogue). The latter arrangement has the advantage that it is not necessary to provide relative rotation between the bolt 20 and the bolt fastener 50. Relative rotational movement which is required between bolt 20 and nut 51 is more time consuming than crimping and can be difficult for the operator in some instances, for example, when the operator is standing on a ladder while mounting the safety appliance member on a railway car. It also avoids the necessity of heating and bending the shank to retain the fastener on the shank as is the case when a threaded nut is used. After application of bolt fastener 50, if a shear groove 23 is provided in shank portion 22, the portion of the shank above shear groove 23 may be removed as shown in FIG. 3 with the crimping or swaging tool during crimping or swaging, or a hammer blow.

Retainer 30 may be dimensioned such that the body portion 31 of the retainer seal completely covers the key hole slot 12. In this case the key hole slot 12 is sealed and significant amounts of water and other material are prevented from entering the space behind surface through slot 12. As can be seen from FIG. 3, after bolt fastener is tightened down to hold safety appliance member 40 and retainer 30 in place, retainer 30 may extend longitudinally along bolt shank 22, both above and below mounting surface 14 to provide a partially effective seal.

After bolt fastener 50 is tightened down to safety appliance member 40 in place (FIG. 3), the railway car is usually spray painted. During such painting it is important to insure that paint is applied to the jointure 45 between safety appliance member 40 and the surface 14.

For some applications mounting portion 42 of safety appliance member 40 may be dimensioned to be larger than retainer 30. Thus retainer 30 does not extend beyond mounting portion 42 and the paint is readily applied to the safety appliance member-mounting surface jointure.

However, if retainer 30 is larger than mounting portion 42, the edges 33 (FIG. 2) of the retainer tend to bend upwardly when the bolt fastener is tightened down. During the subsequent painting operation, these upwardly extending edges make it difficult to ensure that paint is applied completely around the jointure 45 between safety appliance member 40 and mounting surface 14. For some applications, it is not necessary to seal key hole slot 12. For instance when the space behind plate 14 is drained, moisture or other material entering the slot will be removed by gravity. For such applications the retainer 30 need not cover all of key slot 12, and the retainer 30 may be made smaller than mounting portion 40 of safety appliance member 40 and the juncture 45 between safety appliance member 40 and surface 14 can be spray painted with assurance that the juncture will be covered.

However, if drainage does not occur in the space behind the mounting surface 14, it is desirable to ensure that key hole slot 12 is sealed and at the same time avoid the edges 33 of retainer 30 interferring with spray painting of the safety appliance member mounting surface jointure 45. To solve this problem, caulking material, such as a strip of caulking tape 35 may be applied to retainer 30. Caulking tape 35 can conveniently be applied to the retainer seal before it is applied to shank 22. Alternatively, the caulking tape may be applied to retainer 30 after the fastening bolt has been inserted into key portion 18 of slot 12 prior to application of safety appliance member 40 to bolt shank 22. After the safety appliance member 40 has been tightened down by means of bolt fastener 50, caulking material 35 may be spread around the mating surfaces of safety appliance member 40 and mounting surface 14 by a putty knife or the like to obtain a good seal. The caulked joint can then be spray painted with assurance that the joint is sealed.

FIGS. 4 and 5 illustrate the mounting of a ladder rung upon a channel member 100 having a longitudinal axis $A_4$ and parallel mounting surfaces 101 and 102 with a depressed portion 103 therebetween. For each rung to be mounted a pair of key slots 111 and 112 are provided. The respective key portions 115 and 116 of the slots 111 and 112 are in alignment along axis $A_3$ but extend in opposite directions from the respective head receiving portions 113 and 114 which are closest to each other.

A fastening bolt 120 is inserted into each of slots 121 and 122 by placing the fastening bolt shank along the longitudinal axis $A_3$ of the slot inserting the head portion edgewise into head receiving portions 113 and 114 and rotating the fastening bolt about an axis $A_5$ extending transversely to the slot and longitudinally of the mounting surfaces 101 and 102 as described above in connection with FIGS. 1 and 2. Preferably prior to insertion of the bolts 120 into slots 121 and 122, a retainer 130 is applied to the shank portion 122 of each fastening bolt 120 to ensure that the fastening bolt will not drop completely into the slot and be lost behind the mounting surface. In this example, the shank portions 122 of the fastening bolts are grooved to hold the retaining seal 130 in place during insertion. Each of the fastening bolts 120 is then moved to the outermost part of the respective key portions 115 and 116 of the slots. The shanks 122 then extend out of each key portion 115 and 116, with head portion 124 maintaining the bolts in the respective key portions. If the slots are to be sealed and the size of the retainer 130 is not large enough to cover the entire slot, caulking material 135 may be applied to the retainer before a ladder rung 140 is applied to the respective outwardly extending shanks 122. Ladder rung 140 includes a rung portion 141 and a pair of mounting surfaces 143 and 144 having respective mounting openings therein 145 and 146. Collars 153 are applied to each of shanks 122 and are crimped and/or swaged in place with a crimping tool to maintain the ladder rung in place on mounting surfaces 101 and 102.

As mentioned above, key slots 111 and 112 are mounting horizontally with the longitudinal axis $A_3$ of the slots horizontal. The mounting openings 145 and 146 in ladder rung 140 are spaced such that these openings will align with the fastening bolt shanks 122 only in the outermost part of the respective key slot portions 115 and 116. This provides insurance against the fastening bolts 120 coming out even if one or both bolt fasteners 153 would become removed in use.

Alternatively, as shown in FIG. 6, slots 111a and 112a may be formed in surfaces 101 and 102 in alignment along axis $A_3$ with their respective key portions 115a and 116a closest to each other, each extending away from its respective head portion 113a and 114a. Shanks 122 will only align with spaced openings in a safety appliance member (not shown) when the shanks 122 are moved into the respective key portions 115a and 116a.

As mentioned above, the blind hole fastening arrangement of the present invention may be used to mount a support for a safety appliance as well as the safety appliance itself. Thus in FIGS. 6 through 7 and 8 ladder 200 formed from a pair of angles 202 and 204 has mounted therebetween a plurality of ladder rungs 212, by means of conventional nut and bolt fasteners 210. U-shaped support members 222 are affixed to the respective angle members 202 and 204 by means of fasteners 205. The support members 222 are each affixed to a corrugation C of a box car end by means of the blind hole fastening arrangement of the present invention. Openings in support members 222 for the blind hole fasteners are provided at 230 and 232 in FIG. 7. Also in FIG. 7, the key slots 240 and 242 shown in dotted lines are formed in alignment with their longitudinally axis $A_6$ horizontal and the head receiving portions 241 and 243 facing each other with the key portions 245 and 247 extending away from each other. As shown in FIG. 8, a fastening bolt 250 having a shank portion 252 and a head portion 254 is inserted into each slot 240 and 242. A retainer 260 is affixed to shank portion 252 to prevent the fastening bolt from becoming lost during insertion in the corrugation. The openings 230 and 232 extending horizontally in the supports 222 are spaced such that these openings will align with the bolt shanks 252 only at the extreme end portions of the respective key portions 245 and 247 of slots 240 and 242. As mentioned above, this reduces any tendency of the bolts coming out of the slots and the supports and ladder falling off the car. Bolt shanks 252 are threaded at 255 and threaded nuts 256 are used to maintain the supports 222 against retainer 260 and box car corrugation C.

In another embodiment of the present invention, shown in FIGS. 6, 9, 10 and 10A, walkway 270 is shown supported by a plurality of support members 272. Each of the support members is mounted on a box car corrugation C by means of the blind hole fastening arrangement of the present invention. As shown in FIG. 10, the box car end 280 includes an end member 282 having corrugations therein 284. A liner 286 is affixed to end member 282 by welding as indicated at 288. End member 282 is offset as indicated at 290 and the lower offset portion 292 is affixed with fasteners 294 to the box car end sill 296 and to a lower leg 274 of support 272. It is apparent from FIG. 10 that a blind hole 298 exits between box car end corrugation 284 and liner 286. Supports 272 are affixed to corrugations 284 using the blind hole fastening arrangement of the present invention indicated generally at 300. This embodiment differs from the fastening arrangements shown in FIGS. 4, 5 and 7 and 8 in that the slots 302 extend vertically rather than horizontally. Slots 302 include a head receiving portion 304 and a key portion 306 extending vertically below head portion 304. A bolt 310 has a shank portion 312 to which is affixed a retainer 320. The bolt head portion 314 is inserted into the head receiving portion 304 of slot 302 and is then moved downwardly into key portion 306 where shank portion 312 extends outwardly. The supports 272 have openings 273 which are applied to shanks 312 and bolt fasteners 318 are crimped in place against retainers 320. Since drainage is not provided from space 298, retainer 320 is sufficiently large to cover and seal slot 302. Conventional fasteners 294 and blind hole fasteners 300 are both easily inspected and can be tightened and/or replaced to insure that walkway 270 remains secure on the car.

In still another embodiment of the present invention, it is possible to use the mounting arrangement of the present invention to directly mount a portion of a safety appliance on a railway car and also mount support members for the safety appliance with this mounting arrangement. As an example, a handhold is illustrated in FIGS. 6, 11 and 13 at 330. The handhold includes a grabbing portion 332 and a pair of end portions 334 and 336 which are bent inwardly and which engage a corrugation on the end of a box car. Each of the end portions 334 and 336 includes a mounting portion 338 having an opening therein 339, which is held in place by the mounting arrangement of the present invention indicated generally at 340 including vertically extending key slots 341 having a head receiving portion 342 and a key portion 344. A retainer 346, fastening bolts 348 having a head portion 349 and a shank portion 350 and bolt fasteners 351 are assembled as described above.

What is claimed is:

1. A railway freight car bind hole mounting assembly comprising:

at least one key hole slot formed in the mounting surface of the car where an external appurtenance is to be mounted; said slot including a generally segmental arcuate head receiving portion for inserting a generally arcuate, complementary head of a fastening bolt, and a key portion of smaller size forming a continuation of said head receiving portion, for retaining the fastening bolt in the slot; said fastening bolt including a shank portion and a generally arcuate, complementary bolt head portion slightly smaller than said head receiving portion and contoured to mate with said head receiving portion, the relative dimensions between said head receiving portion and said bolt head being such that the bolt head can only be inserted into said head receiving portion edgewise, when said shank portion is generally parallel to said mounting surface, by rotating said bolt head into said head receiving portion; said bolt head portion being sufficiently large that when said bolt head is moved into said key portion, with the shank portion of the bolt extending outwardly through said key portion, said key portion will retain the fastening bolt in the slot; said shank portion including means for maintaining a plastic retainer in place on said shank; a plastic retainer, separate from said fastening bolt, mounted on said shank portion of a size sufficient to prevent said fastening bolt from dropping through said key slot while said bolt head is inserted into said head receiving portion, and is moved into said key portion; an external appurtenance to be mounted including at least one opening of sufficient size to receive said shank portion; at least one bolt fastener on said shank maintaining said external appurtenance against said retainer and said retainer against said mounting surface.

2. An assembly according to claim 1 wherein the mounting surface is the outer surface of a railway freight car.

3. An assembly according to claim 1 wherein said bolt fastener includes a collar crimped in place on said shank.

4. An assembly according to claim 1 wherein the means for maintaining the retainer on said shank includes threads.

5. An assembly according to claim 4 wherein said bolt fastener includes a nut threadably engaging the threads on said shank.

6. An assembly according to claim 1 wherein the means for maintaining the retainer on said shank includes grooves.

7. An assembly according to claim 6 wherein said bolt fastener includes a collar crimped in place on said shank.

8. A railway freight car blind hole mounting assembly comprising:

at least one key hole slot formed in the mounting surface of the car where an external appurtenance is to be mounted; said slot including a generally segmental arcuate head receiving portion for inserting a generally arcuate, complementary head of a fastening bolt, and a key portion of smaller size forming a continuation of said head receiving portion, for retaining the fastening bolt in the slot; said fastening bolt including a shank portion and a generally arcuate, complementary bolt head portion slightly smaller than said head receiving portion and contoured to mate with said head receiving portion, the relative dimensions between said head receiving portion and said bolt head being such that the bolt head can only be inserted into said head receiving portion edgewise, when said shank portion is generally parallel to said mounting surface, by rotating said bolt head into said head receiving portion; said bolt head portion being sufficiently large that when said bolt head is moved into said key portion, with the shank portion of the bolt extending outwardly through said key portion, said key portion will retain the bolt in the slot; said shank portion including means for maintaining a plastic retainer in place on said shank; a plastic retainer, separate from said fastening bolt, mounted on said shank of a size sufficient to prevent said fastening bolt from dropping through said key slot while said bolt head is inserted into said head receiving portion and is moved into said key portion of the slot; an external appurtenance to be mounted including at least one opening of sufficient size to receive said shank portion; at least one bolt fastener on said shank maintaining said external appurtenance against said retainer and said retainer against said mounting surface; said retainer sealing said key slot to substantially prevent water and other material from entering said slot.

9. An assembly according to claim 8 wherein said retainer completely covers said key hole slot.

10. An assembly according to claim 9 wherein the mounting surface of said external appurtenance completely covers said retainer in assembled position.

11. An assembly according to claim 10 including caulking material positioned on the juncture between said external appurtenance and said mounting surface.

12. An assembly according to claim 8 including caulking material positioned on retainer.

13. An assembly according to claim 12 wherein said retainer covers a portion only of said slot, and wherein said caulking material covers the remainder of said slot in assembled position.

14. An assembly for blind hole mounting of an external appurtenance on a mounting surface comprising: a pair of key hole slots in the mounting surface where the external appurtenance is to be mounted; each slot including a generally segmental arcuate head receiving portion for inserting a generally arcuate, complementary head of a fastening bolt, and a key portion of smaller size forming a continuation of the slot, for retaining the fastening bolt in the slot; the key portions and the head portions of each of said slots being aligned in a plane with the key portions extending in opposite directions in the mounting surface from the respective head receiving portions; a pair of fastening bolts for insertion respectively into each of said slots, each fastening bolt including a shank portion and a generally arcuate, complementary bolt head portion slightly smaller than its respective head receiving portion and contoured to mate with its respective head receiving portion; the relative dimensions between the head receiving portions and the respective bolt heads being such that the bolt heads can only be inserted into the respective head receiving portions edgewise when the respective shank portions are generally parallel to the mounting surface, by rotating said bolt heads into the respective head receiving portions; the respective bolt head portions being sufficiently large that when each bolt head is moved into its respective key portion, with the shank portion of the bolt extending outwardly through the key portion of the slot, the respective key portions will retain the respective fastening bolts in the slots; each of said shank portions including means for maintaining a plastic retainer in place on said shank; a plastic retainer, separate from said fastening bolt, mounted on each of said shanks of a size sufficient to prevent its respective fastening bolt from dropping through its respective key slot while the bolt head is inserted into said head receiving portion of the slot and is moved into said key portion of the slot; an external appurtenance to be mounted including at least a pair of openings of sufficient size to receive said shank portion; said pair of openings being spaced such that said shanks will align with said spaced openings only when said fastening bolts are located in the key portion of said slots; at least one bolt fastener on each said shank maintaining said external appurtenance against each said retainer and each said retainer against said mounting surface.

15. An assembly according to claim 14 wherein the head receiving portions of said pair of slots in said plane are closest to each other.

16. An assembly according to claim 14 wherein the key portion of said pair of slots are closest to each other.

17. An assembly according to claim 14 in which said pair of key hole slots extend horizontally in said plane of said mounting surface.

18. An assembly according to claim 14 wherein said retainer seals one said slot.

19. An assembly according to claim 18 including caulking material positioned on each of said retainers.

20. An assembly for blind hole mounting an external appurtenance on a mounting surface comprising: at least one key hole slot formed in the mounting surface where the external appurtenance is to be mounted; said slot including a generally segmental arcuate head receiving portion for inserting a generally arcuate, complementary head of a fastening bolt, and a generally arcuate key portion of smaller size forming a continuation of said head receiving portion, for retaining the fastening bolt in the slot; said fastening bolt including a shank portion and a generally arcuate, complementary bolt head portion slightly smaller than said head receiving portion and contoured to mate with said head receiving portion; the relative dimensions between said head receiving portion and said bolt head being such that the bolt head can only be inserted into said head receiving portion edgewise when said shank portion is generally parallel to said mounting surface, by rotating said bolt head into said head receiving portion; said bolt head portion being sufficiently large that when said bolt head is moved into said key portion, with said shank portion extending outwardly through the key portion of the slot, said key portion will retain said fastening bolt in the slot; said shank portion including means for maintaining a plastic retainer in place on said shank; a plastic retainer, separate from said fastening bolt, mounted on said shank of a size sufficient to prevent said fastening bolt from dropping through said key slot while said bolt head is inserted into said head receiving portion of the slot and is moved into said key portion of the slot; an external appurtenance to be mounted including at least one opening of sufficient size to receive said shank portion; at least one bolt fastener on said shank maintaining said external appurtenance to be mounted including at least one opening of sufficient size to receive said shank portion; at least one bolt fastener on said shank maintaining said external appurtenance against said retainer and said retainer against said mounting surface.

21. An assembly according to claim 20 wherein said retainer seals said key hole slot in assembled position.

* * * * *

UNITED STATES PATENT AND TRADEMARK OFFICE
CERTIFICATE OF CORRECTION

PATENT NO.  :  4,121,495
DATED       :  October 24, 1978
INVENTOR(S) :  Lowell L. Malo and James R. Zimmerle It is certified that error appears in the above-identified patent and that said Letters Patent are hereby corrected as shown below:

Col. 1, line 21, "are" should read --is--.

Col. 4, line 64, "deformes" should read --deforms--.

Col. 5, line 56, interferring" should read --interfering--.

Col. 6, line 44, "mounting" should read --mounted--.

Col. 10, line 36 (claim 16), after "slots" insert --in said plane--.

Signed and Sealed this

Fifth Day of June 1979

[SEAL]

Attest:

RUTH C. MASON
Attesting Officer

DONALD W. BANNER
Commissioner of Patents and Trademarks